United States Patent
Sakai

[11] Patent Number: 5,239,892
[45] Date of Patent: Aug. 31, 1993

[54] ROTATING DEVICE

[75] Inventor: Hisayoshi Sakai, Utsunomiya, Japan

[73] Assignee: Mitutoyo Corporation, Tokyo, Japan

[21] Appl. No.: 750,568

[22] Filed: Aug. 26, 1991

[30] Foreign Application Priority Data

Aug. 27, 1990 [JP] Japan .............................. 2-89261[U]
Aug. 27, 1990 [JP] Japan .............................. 2-89262[U]
Aug. 27, 1990 [JP] Japan .............................. 2-224867

[51] Int. Cl.$^5$ ...................... F16C 32/06; A47B 11/00; B32B 29/32
[52] U.S. Cl. .................................. 74/813 L; 74/822; 108/20; 108/139; 310/52; 384/100; 384/107; 384/113
[58] Field of Search .......................... 74/813 R, 813 L; 188/170, 218 XL; 108/20, 139; 310/52; 384/100, 107, 313, 113

[56] References Cited

U.S. PATENT DOCUMENTS

| | | | |
|---|---|---|---|
| 2,885,915 | 5/1959 | Schurger | 384/100 X |
| 3,301,356 | 1/1967 | Pompa | 188/218 XL X |
| 3,435,924 | 4/1969 | Beuchle | 188/218 XL |
| 3,497,273 | 2/1970 | Muijderman et al. | 384/113 |
| 3,583,205 | 6/1971 | Erle | 384/100 X |
| 3,772,961 | 11/1973 | Siebert | 384/100 X |
| 4,256,312 | 3/1981 | Ikeda | 384/100 X |
| 4,615,418 | 10/1986 | Atwell | 188/170 |

*Primary Examiner*—Allan D. Herrmann
*Attorney, Agent, or Firm*—Flynn, Thiel, Boutell & Tanis

[57] ABSTRACT

A rotating device possesses a fixed portion and a movable portion equipped with a rotary shaft, and is equipped with a rotor that can be fastened in an integrated manner to the rotary shaft via a fastening device. Said rotating device is composed of a driving device which directly rotates the rotary shaft, a fluid bearing device which reduces the friction between the fixed portion and the movable portion, a disk provided on the movable portion which is elastically deformable in the direction of thrust, a clamping device provided on the fixed portion which stops the rotation of a turntable by clamping the disk, a positioning jig which makes fine changes in the position of the rotor in the radial direction with respect to the rotary shaft, and a monitoring device which monitors the status of rotation of the rotor.

13 Claims, 14 Drawing Sheets

ROTATING DEVICE

BACKGROUND OF THE INVENTION

1. Field of the Invention

The present invention relates to a rotating device which is used in devices that perform precision measurement of measured objects or precision processing of workpieces, and, more particularly, to the frictional resistance between the fixed portion and the movable portion, the stopping of the driving of the movable portion, and a fine positioning mechanism and fine positioning method of a rotor which are used for performing adjustment during attachment of a rotor, such as an encoder disk, to a rotary shaft so as to eliminate eccentricity and so on of the rotor with respect to the rotary shaft.

2. Description of the Related Art

In the prior art, a wide range of various types of rotary tables were used mounted onto machine tools such as NC lathes and milling machines or precision measuring machines such as roundness measuring instruments and three-dimensional measuring instruments.

Such types of rotary tables, for example, contain a fixed portion and a movable portion, with a turntable, on which the processed workpiece or measured object is placed, mounted on the movable portion. This turntable is provided with an integral shaft and comprises the rotary table by means of this shaft and the shaft of a servo motor being coupled via a speed reducer or coupling, etc.

However, as the prior art typically consisted of the servo motor, coupling and turntable oriented in a row in the axial direction, the height of such a rotary table was considerably high. As a result, when such rotary tables are attempted to be applied, for example, in three-dimensional measuring instruments for which the measuring range in the vertical direction is set in advance, the actual measuring range is reduced making such rotary tables undesirable for use.

As such, rotary tables were conceived in which the motor is oriented not in the axial direction, but rather in the horizontal direction thereby reducing the total height of the rotary table. Examples of these are indicated in FIGS. 13, 14 and 15.

In the block diagrams of FIGS. 13 and 14, rotary table 200 contains fixed portion 201, consisting of a casing and so on, and movable portion 202 which is allowed to rotate freely supported on said fixed portion 201, and turntable 203 is contained within said movable portion 202. Turntable 203 is provided with a shaft not shown in the drawing. A cross roller bearing (not shown) is mounted on this shaft, or in other words, between movable portion 202 and fixed portion 201. Moreover, drive device 210 is coupled to this shaft.

As is indicated in FIG. 15, drive device 210 contains worm wheel 211 attached to the previously mentioned shaft (not shown), and worm gear 212 engages with said worm wheel 211. In addition to said worm gear 212 being supported by fixed portion 201 via two bearings 213, speed reducer 217, comprised of primary gear 214, secondary gear 215 and tertiary gear 216, is mounted on one end of said worm gear 212, with output shaft 219 of servo motor 218 coupled to said tertiary gear 216.

In rotary table 200 which is composed in this manner, servo motor 218 must first be driven in order to rotate turntable 203. The torque of said servo motor 218 is transmitted to worm gear 212 after being reduced by speed reducer 217. Moreover, after the direction of the rotary shaft of said servo motor 218 is changed by worm gear 212 and worm wheel 211, the torque of said servo motor 218 is transmitted to turntable 213 through a shaft (not shown) formed in an integrated manner on worm wheel 211, resulting in rotation of turntable 213.

Thus, in the case of rotary table 200, turntable 203 is driven indirectly through speed reducer 217, worm gear 212, and worm wheel 211 by servo motor 218.

However, in such a case, due to turntable 203 being driven through worm wheel 211, worm gear 212 and speed reducer 217, the structure of the device becomes quite large. Moreover, when stopping and rotating is repeated, unevenness forms in the rotation of turntable 203, especially due to the action of backlash that occurs at this time, resulting in a decrease in rotational accuracy.

As a result, this exposes the fault of difficulty in the precision measurement of measured objects and in the precision processing of processed workpieces.

In addition, when this rotary table 200 is driven for a long period of time, the temperature in the vicinity of servo motor 218 rises locally due to generation of heat within said servo motor 218. This then leads to the occurrence of strain in fixed portion 201 and eventually in turntable 203. Thus, there is the risk of decreased rotational accuracy in terms of this point also.

Furthermore, in this rotary table 200, there are many cases in which a contact-type, cross roller bearing not shown in the drawing is externally mounted on the shaft (not shown) which is formed in an integrated manner with turntable 203.

Such contact-type bearings having a rotational accuracy of 1 micrometer or less are extremely rare. If bearings having a low level of accuracy are used, the shaft (not shown) of turntable 203 will bend which will result in the risk of decreased rotational accuracy. In addition, the use of specially selected high-precision bearings will not only result in a remarkable decrease in productivity, but will also result in the disadvantage of raising the cost of said turntable 200. As such, the first objective of the present invention is to provide a rotary table to be used as a rotating device which is compact, is minimally subjected to the effects of backlash, and does not produce unevenness in rotation.

In addition, as is indicated in FIG. 16, bearing 204 and O-ring 205, which prevents the entry of oil, etc. into the inside of the device, are mounted between turntable 203 and fixed portion 201. Moreover, highly rigid projection 206 is provided beneath bearing 204 projecting outwardly in the radial direction in an integrated manner from turntable 203.

Furthermore, clamping device 230, which clamps turntable 203 to fixed portion 201, is mounted at the bottom of fixed portion 201.

Clamping device 230 contains cylinder chamber 231 formed in fixed portion 201, and said cylinder chamber 231 is provided with air connection hole 232 which supplies air to said cylinder 231. In addition, cylinder cap 234 is fit into said cylinder chamber 231 via O-ring 233. Moreover, piston rod 237 is inserted via rod packing 236 into center hole 235 formed in said cylinder cap 234.

Shaft 241 is provided in an integrated manner on the top of piston rod 237 via piston 239 having piston packing 238 around its perimeter. The top of said shaft 241 projects from fixed portion 201 and opposes projection 206 of turntable 203.

On the other hand, together with coil spring 242 for applying pushing pressure being mounted on the outside of the bottom of shaft 241, said coil spring 242 is also mounted between spring holder 243 provided on fixed portion 201 and piston 239. Thus, although piston 239 is forced in the downward direction in the drawing by the action of coil spring 242, shaft 242 is constantly separated from projection 206 of turntable 203. On the other hand, when air under high pressure is supplied to cylinder chamber 231, piston 239, and in turn, shaft 241 move upward in opposition to coil spring 242.

Furthermore, through hole 244 is formed in shaft 241, piston 239 and piston rod 237 to connect the inside of the chamber in which coil spring 242 is mounted with the outside.

When an emergency stop button, etc. not shown in the drawing is pressed in order to instantly stop turntable 203 with clamping device 203 during rotation of turntable 203, high-pressure air is first supplied to cylinder chamber 231 via air connection hole 232 from a compressed air source (not shown). As a result, since the pressure inside cylinder chamber 231 rises causing piston 239 and shaft 241 to be displaced in the direction of Z indicated with an arrow in opposition to the pushing pressure of coil spring 242, the end of shaft 242 makes contact with projection 206 causing projection 206 to be pushed towards fixed portion 201 thereby stopping rotation.

However, in this case, as projection 206 is of a comparatively rigid structure and is formed in an integrated manner from turntable 203, projection 206 is naturally subjected to force in the Z direction, or in other words, in the thrust direction with respect to the rotary shaft of turntable 203, due to the pushing pressure in the Z direction by shaft 241. This force ends up being transmitted to turntable 203.

Moreover, in the case shaft 241 pushes on projection 206 at a slight angle in the radial direction with respect to the vertical direction due to the effects of incorporation tolerance and so on, force in the thrust direction (indicated with a Z) along with force in the radial direction (indicated with an X), that is perpendicular to that, are generated during clamping. These forces being applied in two directions are then transmitted to turntable 203 via projection 206.

From among the forces that act on turntable 203, force in the thrust direction is transmitted to bearing 204 that is provided between turntable 203 and fixed portion 201. This results in the contact position of bearing 204 and turntable 203 being shifted slightly out of position which results in the formation of a gradient with respect to the horizontal direction of turntable 203. On the other hand, the previously mentioned force that is applied in the radial direction (indicated with an X) acts essentially acts in the radial direction of turntable 203. This force that acts in the radial direction ends up creating eccentricity in turntable 203, and deteriorates the rotational accuracy combining with the positional displacement caused by the force in the thrust direction.

This results in the disadvantage of it becoming difficult to perform precision measurement or precision processing of measured objects and workpieces attached to turntable 203.

Thus, the second objective of the present invention is to provide a rotary table to be used as a rotating device in which there is extremely little creation of eccentricity in the turntable and virtually no deterioration of accuracy.

Moreover, at the time of incorporation of a rotary encoder into the rotary table, the rotary shaft of the rotary table and the encoder disk, functioning as the rotor which is a portion of the rotary encoder, may become slightly off center by several micrometers.

When the rotary table is allowed to rotate under such circumstances, the angular indexing accuracy of said rotary table is lowered making precision measurement of measured objects and precision processing of workpieces difficult.

As such, various devices have been proposed which compensate for the eccentricity at a fixed position with respect to the rotary shaft of the encoder disk acting as a rotor.

An example of one of these devices involves the performing of fine positioning by subjecting the rotary encoder to slight vibrations. However, in the case of such devices, since a vibrating device such as a vibrator is used, in addition to the size of the device increasing, it also has the disadvantage of resulting in higher costs.

In addition, set screws, with which the rotor is attached to the rotary shaft, are provided equidistant to each other at 90 or 60 degree angles. Positioning is thus performed by changing the amount by which these set screws are pushed in. However, in the case of such a mechanism, since the amount the set screws are pushed in is determined according to the product of the lead of the set screws and the angle of rotation, the lead of the set screws should be made quite small in order to allow the making of fine adjustments by reducing the amount the set screws are pushed in with respect to the same angle of rotation. However, as there are limits as to how small the lead of the set screws can be made, it was difficult to allow the making of adequate fine adjustments such as that in the case of positioning on the order of a sub-micron meter.

Thus, the third objective of the present invention is to provide a fine positioning mechanism and fine positioning method that allows fine positioning of a rotor, such as an encoding disk, attached to the rotary shaft of a rotating device to be performed easily while also preventing the occurrence of eccentricity.

SUMMARY OF THE INVENTION

To achieve the first objective described above, the present invention consists of: a rotating device possessing a fixed portion and a movable portion equipped with a rotary shaft; and, a rotor that can be fastened in an integrated manner onto said rotary shaft via a fastening mechanism; wherein, said rotating device is equipped with a driving device which directly rotates said rotary shaft, a fluid bearing device which reduces the friction between said fixed portion and a movable portion, and a through hole which is formed in said fixed portion for supplying fluid to said fluid bearing device.

In the present invention, it is preferable that the driving device be a direct drive motor, while it is preferable that the fluid bearing device be an air bearing.

Moreover, in the case the fluid bearing device is an air bearing, it is preferable that a flow path which connects the air bearing and the vicinity of the driving device be provided in the movable portion to allow the supply of air within the air bearing to the driving device as cooling air through said flow path.

In the case of the rotary table related to the present invention, since a driving device consisting of a direct drive motor and so on, which directly drives a shaft, is mounted to said shaft which is provided on a turntable in an integrated manner, a speed reducer, worm gear, worm wheel and other devices can be eliminated, thereby allowing the device to be made more compact while also resulting in improved rotational accuracy due to the absence of backlash.

In addition, as a fluid bearing device consisting of an air bearing and so on is formed between the fixed portion and the movable portion, and since a through hole is provided in the fixed portion for a fluid such as air, the rotation of the turntable is extremely smooth.

Furthermore, if an air bearing is used for the fluid bearing device and a flow path is provided for guiding a portion of the air of the air bearing to the vicinity of the driving device, as air enters from this flow path into the vicinity of the driving device, heat that is generated there can be released to the outside. Thus, thermal expansion of the turntable and so on can be prevented before it occurs thus allowing more sophisticated precision measurements.

In addition, to achieve the second objective described above, the present invention takes advantage of the fact that disadvantages of the prior art were caused by a highly rigid turntable projection directly pushing against a fixed portion. In other words, the present invention consists of: a disk attached to the turntable which can be elastically displaced at least in the direction of the thrust of the turntable, while also having holes formed in it along the direction of rotation; wherein, in order to stop the rotation of the turntable, instead of applying a pushing force directly to the fixed portion as in the prior art, the disk on the turntable is clamped by a clamping device mounted on the fixed portion which in turn stops the rotation of the turntable.

In the present invention, during clamping of the disk by the clamping device, the force that is produced in the direction of thrust is absorbed by the elastic deformation of the disk, while the force in the radial direction, which is roughly perpendicular to the force in the thrust direction, is absorbed by the holes provided along the direction of rotation. Thus, since eccentricity and inclination of the turntable can be prevented before they occur, the turntable can be stopped without any decrease in rotational accuracy. As a result, precision measurement of measured objects and precision processing of workpieces become possible.

Moreover, to achieve the third objective described above, the present invention consists of: a fixed portion and a movable portion equipped with a rotary shaft; and, a mechanism for easily allowing fine positioning in the radial direction with respect to said rotary shaft of a rotor that can be fastened in an integrated manner to said rotary shaft via a fastening device; wherein, said mechanism is equipped with a positioning jig, which can be attached and removed from said rotary shaft, supports said rotor and allows fine changes to be made in the position of said rotor in the radial direction with respect to said rotary shaft; and, a monitoring device which monitors the rotational status of said rotor.

In the present invention, it is preferable that the fastening device by which said rotor is fastened to said rotary shaft be composed of a plurality of locking screws provided around the periphery of the rotor. Support of the rotor by said positioning jig is accomplished by pinching performed by a plunger, which makes contact with one side of the rotor via a pressure device and is screwed into said positioning jig to allow it to move backward and forward, and a projection, which makes contact with the other side of said rotor at a location opposite to that of said plunger and is provided in an integrated manner on said positioning jig to allow elastic deformation. Moreover, it is also preferable that fine displacement of the rotor by said positioning jig be accomplished by a set screw which is able to displace said rotor in opposition to the pressure device of said plunger by elastically displacing said projection in opposition to said positioning jig.

The method of the present invention possesses a fixed portion and a movable portion equipped with a rotary shaft and employs a positioning jig which can be attached and removed from said rotary shaft, supports said rotor and allows fine changes in the position of said rotor in the radial direction with respect to said rotary shaft; and, a monitoring device, which monitors said rotor, in the fine positioning of said rotor, which can be fastened in an integrated manner to said rotary shaft via a fastening device, in the radial direction with respect to said rotary shaft; wherein said positioning jig is equipped with a plunger, which makes contact with one side of said rotor via a pressure device and is screwed into said positioning jig to as to be able to move backward and forward; a positioning jig to as to be able to move backward and forward; a projection, which makes contact with the other side of said rotor at a location opposite to that of said plunger and is formed in an integrated manner on said positioning jig to allow elastic deformation; and, a set screw which is able to displace said rotor in opposition to the pressure device of said plunger by elastically deforming said projection with respect to said positioning jig; such that after said rotor has been temporarily locked to said rotary shaft by a fastening device, the plunger is screwed in so that the projection of said positioning jig makes contact with the other side of the rotor in the state in which it has been pre-deformed by said set screw, the rotor is pinched between the plunger and the projection at a specified pressure, the positioning jig is attached to the rotor and the positioning jig is locked to the rotary shaft; after which, the fastening device which is temporarily locking the rotor to the rotary shaft is released, the rotary shaft is rotated and adjustments are made to eliminate eccentricity with respect to the rotary shaft of the rotor by moving said set screw back and forth while monitoring the state of rotation of the rotor accompanying this rotation with said monitoring device; finally after which the rotor is locked to the rotary shaft by said fastening device.

In the fine positioning mechanism related to the present invention, fine adjustment of the position of the rotor with respect to the rotary shaft is accomplished by making a fine change in radial direction of the fine positioning jig while monitoring the rotation of the rotor with the monitoring device.

In the fine positioning method related to the present invention, fine adjustment of the position of the rotor with respect to the rotary shaft is accomplished by elastic deformation of the projection of the fine positioning jig by the set screw while monitoring the rotation of the rotor with the monitoring device.

Thus, by suitably setting the distance from the location of the fulcrum at which elastic deformation of the projection occurs to the location at which the set screw acts, extremely fine adjustment of the amount of the displacement of the projection is possible.

Since extremely fine adjustment of the amount of displacement of the projection is possible in this manner, fine adjustment of the position of the rotor with respect to the rotary shaft becomes possible, thus resulting in a remarkable improvement in the indexing accuracy and so on of the rotating device such as a rotary table.

DETAILED DESCRIPTION OF THE PREFERRED EMBODIMENT(S)

A preferred embodiment relating to the rotating device of the present invention will be described in detail with reference to the attached drawings using a rotary table as an example.

Figure 1:
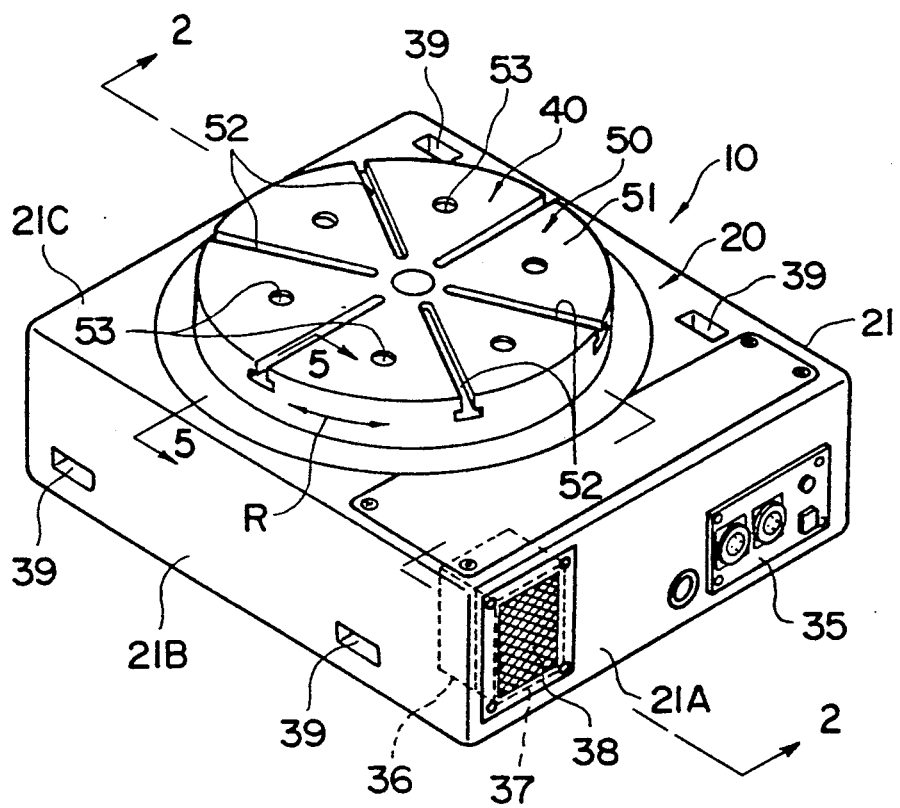
FIG. 1 is a perspective view indicating the appearance of the overall composition.
Figure 2:
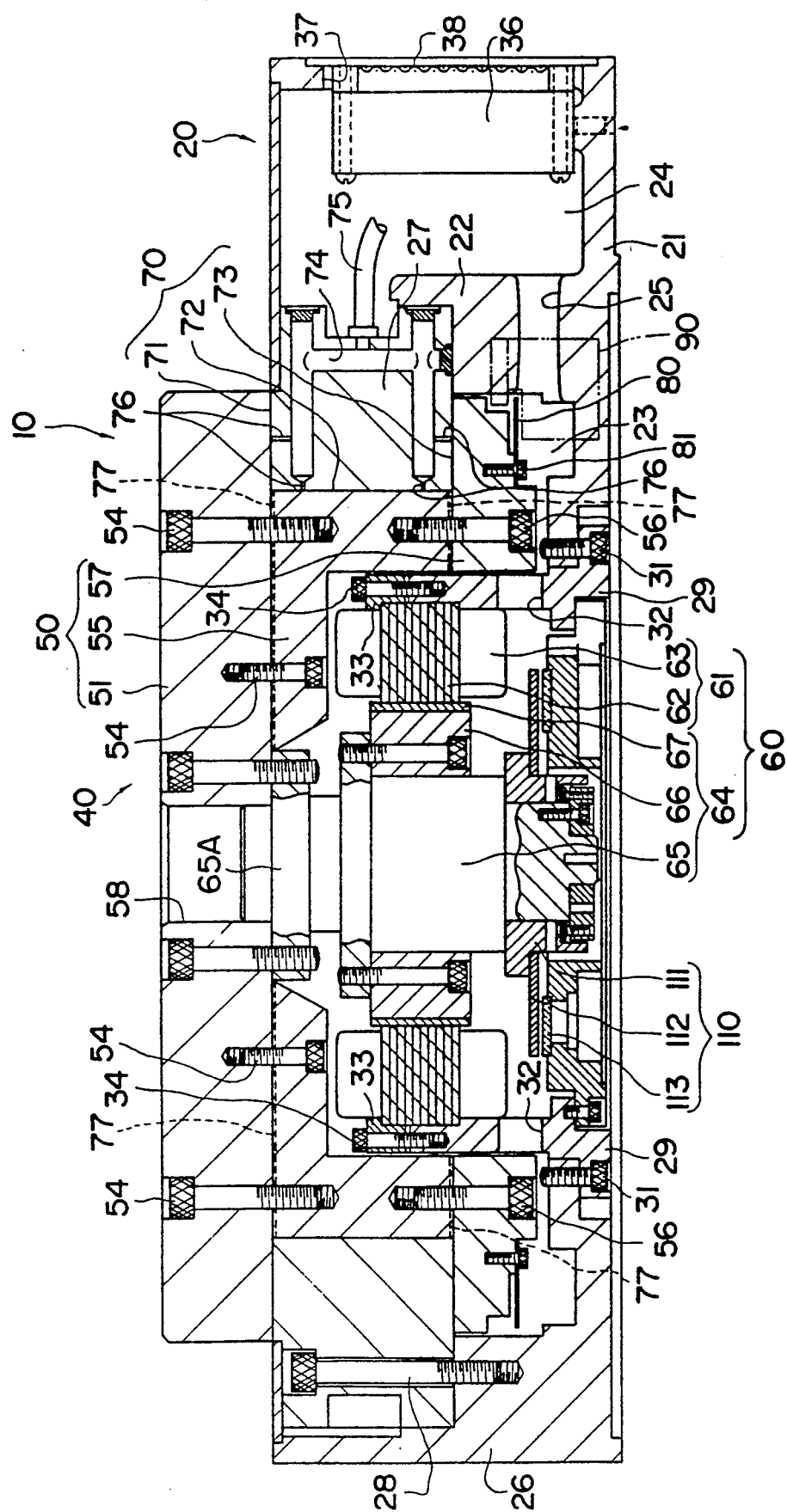
FIG. 2 is an enlarged vertical sectional view of the overall composition, taken along the line 2—2 in FIG. 1.

In FIG. 1 and FIG. 2 which indicate the overall composition, reference number 10 indicates the rotary table of this embodiment. This rotary table 10 contains fixed portion 20 and movable portion 40.

In FIG. 1, fixed portion 20 is equipped with case 21. The right front side 21A of case 21 in the drawing is provided with connector 35, for connecting a power cable or signal cable (not shown), and screen 38 for protecting the fan attached to mounting hole 37 of exhaust fan 36. Mounting holes 39 of case 21 are respectively opened in side 21B and top 21C as well as in the corresponding locations of the back and bottom, not shown in the drawing, which are located on the opposite sides of side 21B and bottom 21C.

Movable portion 40 is allowed to rotate freely in the directions indicated by double-ended arrow R while also being equipped with turntable 50. A plurality of radially formed T-grooves 52 and/or screw holes 53 are provided as necessary in the top of outer plate 51 of turntable 50. Workpieces to be processed by a machine tool, etc. or objects to be measured by three-dimensional measuring instruments, etc. are attached to the top of turntable 50 by T-grooves 52 or screw holes 53.

As is indicated in FIG. 2, the inside of case 21 consists of main chamber 23, in which is arranged movable portion 40 by means of separating wall 22, and auxiliary chamber 24 in which auxiliary components are housed. Ventilation hole 25 is formed in separating wall 22 running between main chamber 23 and auxiliary chamber 24.

Previously mentioned exhaust fan 36 is arranged inside auxiliary chamber 24. The air inside main chamber 23 is suctioned through ventilation hole 25 and auxiliary chamber 24 by the operation of exhaust fan 36 to release the air to the outside from screen 38.

Ring-shaped stationary member 27 is fixed between separating wall 22 of case 21 and thickly formed wall body 26 shown on the left side of FIG. 2 by a plurality of bolts 28 (only one is shown in the drawing). Turntable 50 is supported on this stationary member 27 so as to be able to rotate freely.

In other words, turntable 50 is composed of outer plate 51 protruding to the outside of case 21, partial-bottomed, cylindrical intermediate member 55, which is fixed by bolt 54 to the bottom of outer plate 51 and has an inner diameter smaller than the outer diameter of outer plate 51 and an outer diameter which allows it to tightly engage with the inner diameter of stationary member 27, and hole-equipped, disk-shaped inner plate 57 which is fixed to by bolt 56 to the bottom of intermediate member 55 and has an external diameter roughly equal to the outer diameter of outer plate 51.

Thus, turntable 50 is formed roughly into the shape of a hollow disk overall, having a concave groove in the portion of intermediate member 55 as a result of intermediate member made to have a smaller diameter.

Stationary member 27 thus precisely engages into this concave groove.

Figure 3:
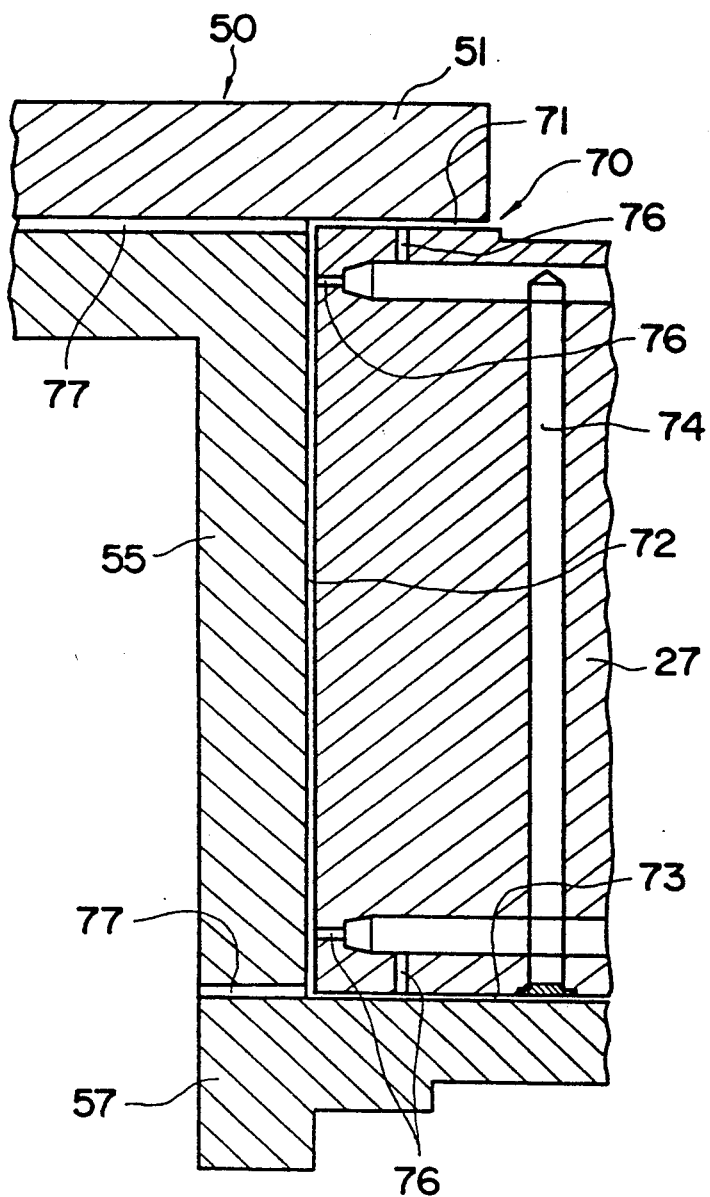
FIG. 3 is an enlarged cross-sectional view of a portion of FIG. 2.

As is indicated in the enlarged drawing of FIG. 3, air film shaped gaps essentially several micrometers in size are formed at specified intervals at those portions where turntable 50 and stationary member 27 engage. More specifically, these consist of upper horizontal gap 71 between the lower surface of outer plate 51 and the upper surface of stationary member 27, vertical gap 72 between the outer surface of intermediate member 55 and the inner surface of stationary member 27, and lower horizontal gap 73 between the upper surface of inner plate 57 and the lower surface of stationary member 27. Air bearing 70, which functions as a fluid bearing device for reducing friction between fixed portion 20 and movable portion 40, is thus formed by these gaps 71, 72 and 73.

Furthermore, when high-pressure air is not being supplied to air bearing 70, upper horizontal gap 70 essentially does not exist, resulting in outer plate 51 and stationary member 27 being in contact due to the weight of turntable 50.

Through holes 74, roughly in the shape of a sideways letter "H", are formed at 8 locations equidistant around the perimeter of stationary member 27 (only one is shown in the drawing). High-pressure air is supplied via pipe 75 from a compressed air source (not shown) to these through holes 74. This air is then supplied to gaps 71, 72 and 73 that compose air bearing 70 via four injection holes 76 linked to each through hole 74.

A portion of the high-pressure air that is supplied to air bearing 70 flows into the inside of turntable 50, and in turn, main chamber 23 of case 21 via flow paths 77 consisting of a plurality of radial grooves respectively formed on the upper and lower surfaces of intermediate member 55 of turntable 50. The location of the introduction of air into main chamber 23 by these flow paths 77 is in the vicinity of the direct drive motor which functions as the driving device to be described later. In addition, these flow paths 77 have diameters of essentially several millimeters.

Within main chamber 23 of case 21, roughly cylindrical stator support member 29 is provided upright at a location that does not interfere with the inner surface of turntable 50, and is fixed in position with bolt 31 on the bottom of case 21. A plurality of ventilation holes 32 are formed passing through the bottom of stator support member 29, and air is allowed to flow to the inside and outside of stator support member 29 via these ventilation holes 32.

Stator 61 of direct drive motor 60, which functions as the driving device, is fixed in position on the upper portion of stator support member 29 by clamping member 33 and bolt 34.

Stator 61 is composed of a roughly ring-shaped core 62, consisting of laminated plates, and coil 63 which is coiled around core 62. Rotor 64, which composes direct drive motor 60 together with stator 61, is arranged to the inside of stator 61.

The upper end of rotor 64 engages with hole 58 formed in the center of outer plate 51 of turntable 50, and is composed of rotary shaft 65, which is bolted to flange 65A, iron core 66, which is bolted to rotary shaft 65 and arranged inside stator 61, and a plurality of permanent magnets 67 consisting of rare earth magnets which are fixed on the outside surface of iron core 66.

Movable portion 40 is thus composed of rotor 64 and turntable 50.

Furthermore, as a result of changing the magnetizing conditions at stator 61 via a control device not shown, the speed (rotational velocity) and direction of rotation of rotor 64 can be controlled as desired. Thus, the present invention is composed such that rotary shaft 65 of direct drive motor 60, or in other words, turntable 50 will rotate in the directions indicated by the double-ended arrow R (see FIG. 1) in accordance with the interaction of stator 61 and rotor 64.

Encoder disk 112 is attached to the lower portion of rotary shaft 65 of rotor 64 via holding member 111. Rotary encoder 110 is composed of encoder disk 112, index scale 113 arranged in opposition to encoder disk 112, and an optical sensor not shown. The speed of rotor 64, and in turn, direct drive motor 60 is detected by rotary encoder 110.

Diaphragm 80, functioning as a disk and consisting of a metal plate made of stainless steel and so on, is fixed on the bottom surface of inner plate 57 of turntable 50 by bolt 81.

Figure 4:
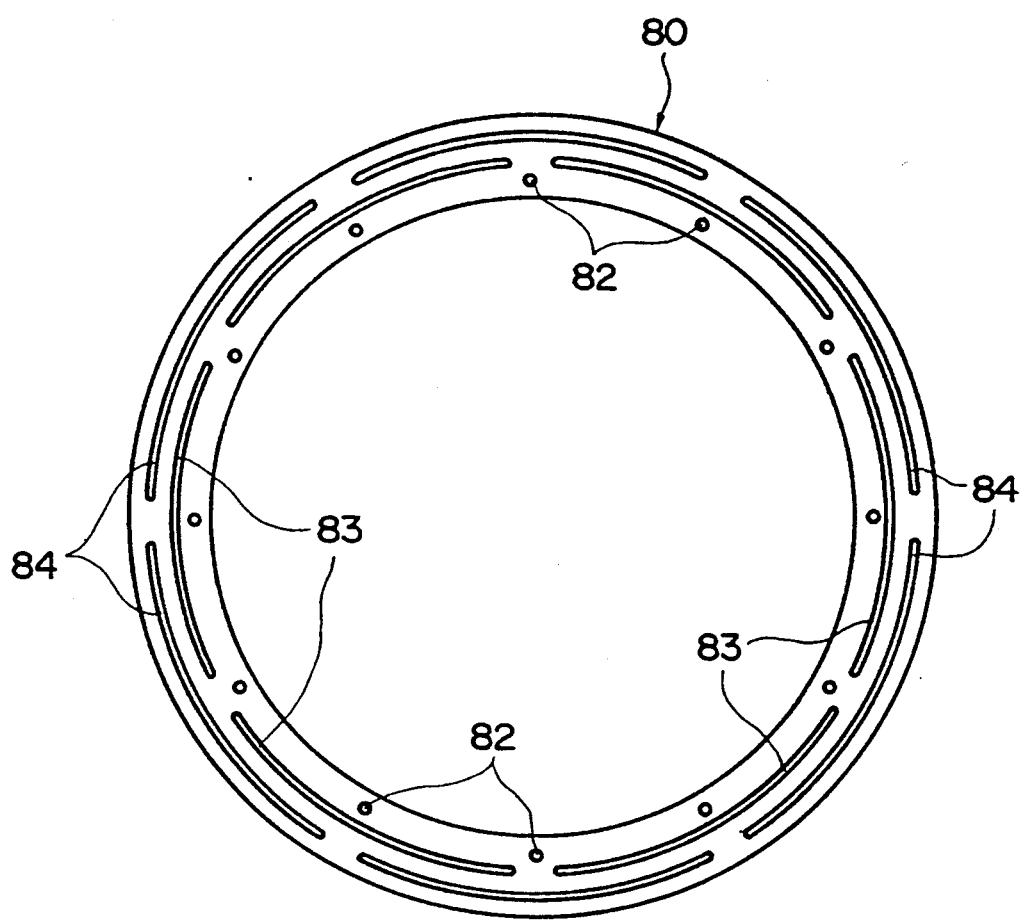
FIG. 4 is an overhead view of a braking disk which is a component of the embodiment of FIG. 1.

As is indicated in FIG. 4, diaphragm 80 is formed into the shape of a thick-walled ring, and contains a plurality of holes 82 separated equidistantly at equal angles around the perimeter of diaphragm 80, through which bolts 81 pass through the inside of the ring. Oblong holes 83 in the form of 6 openings which curve along the direction of rotation of diaphragm 80 are provided to the outside of holes 82. Moreover, oblong holes 84 in the form of 6 similarly shaped openings positioned such that the relative angles are shifted 30 degrees from oblong holes 83 are provided to the outside of oblong holes 83.

As a result, together with diaphragm 80 being elastically deformable in the direction of its thickness, or in other words, in the axial direction of rotary shaft 65, due to the action of oblong holes 83 and 84, it can also be deformed in the radial direction which is perpendicular to the axial direction.

Clamping device 90, which pinches diaphragm 80 and stops the rotation of turntable 50, is mounted on case 21 on the side of fixed portion 20 at a location in opposition to diaphragm 80.

Figure 5:
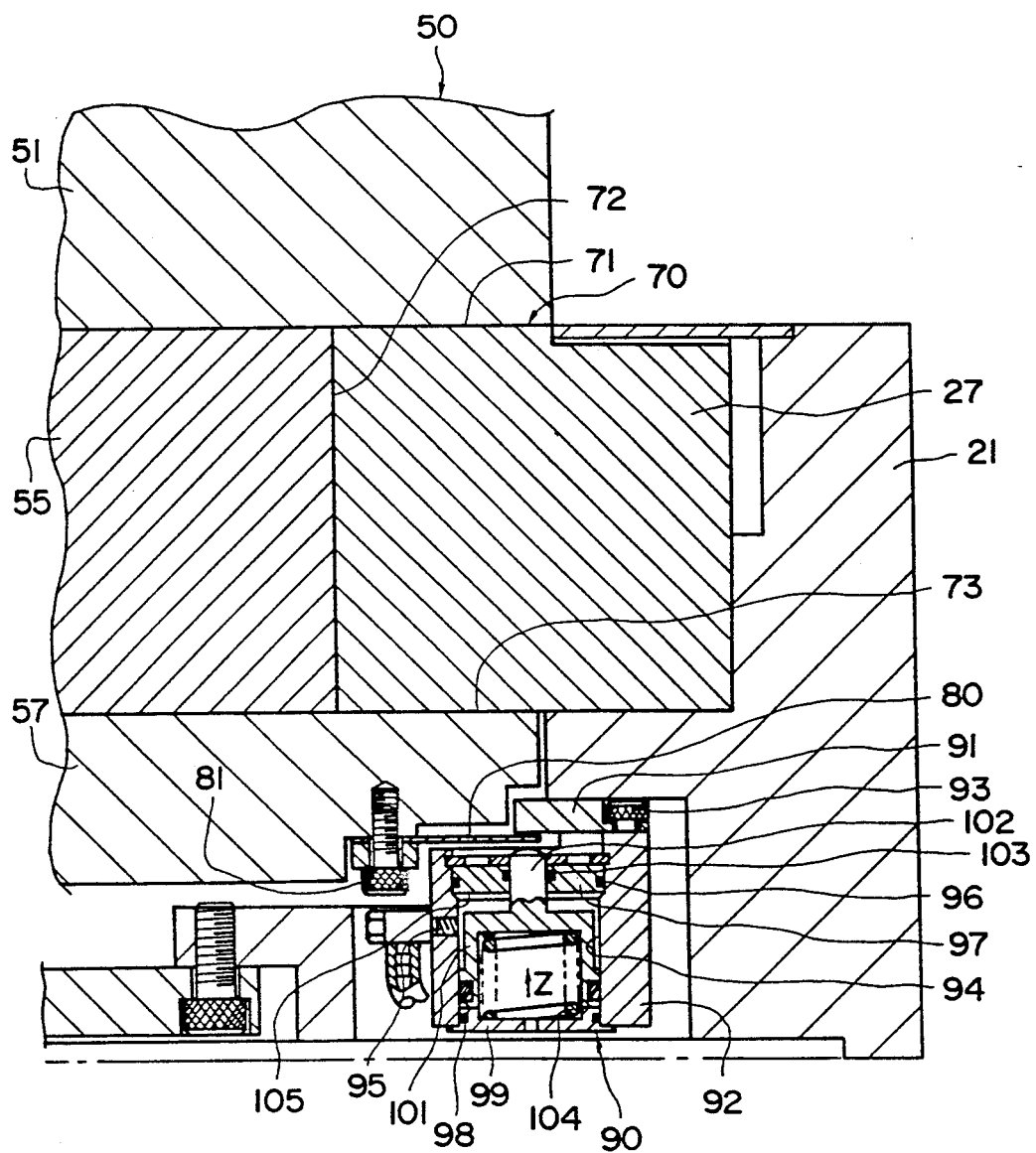
FIG. 5 is an enlarged cross-sectional view taken along the line 5—5 in FIG. 1 and showing a portion of the clamping device.

As is indicated in FIG. 5, clamping device 90 is equipped with attaching member 91 which attaches to fixed portion 20, and square cylinder 92 is fixed on attaching member 91 with bolt 93. Together with cylinder hole 94, having a circular cross-section, being provided on the inside surface of square cylinder 92, air feed hole 95, which is connected to cylinder hole 94, is formed in the side wall of square cylinder 92. Air is thus supplied to cylinder hole 94 via air feed hole 95 from a compressor not shown.

End plate 97 is attached to the opening on the upper end of cylinder hole 94 of square cylinder 92 via O-ring 96. On the other hand, bottom cover 99 is fixed to the opening on the lower end via O-ring 98. Convex-shaped pushing member 101 fits into cylinder hole 94 divided by end plate 97 and bottom cover 99 so as to slide freely, and O-ring 103 is mounted in between projecting shaft 102, formed in pushing member 101, and end plate 97. The end of projecting shaft 102 is formed into the shape of a hemisphere and projects from end plate 97, being positioned in opposition to attaching member 91 via diaphragm 80.

Compression coil spring 104 for applying pushing pressure is mounted between pushing member 101 and bottom cover 99. Projecting shaft 102 of pushing member 101 is constantly forced in the projecting direction (direction Z) by the force applied by spring 104 allowing diaphragm 80 to be clamped by the end of the sphere of projecting shaft 102 and attaching member 91.

On the other hand, when high-pressure air is supplied from air feed hole 95 to cylinder chamber 105 formed in cylinder hole 94 by pushing member 101 and end plate 97, pushing member 101 is moved downward in the drawing in opposition to the force applied by compression coil spring 104. As a result, diaphragm 80 is no longer in the clamped state.

Rotary table 10 pertaining to this embodiment is basically composed as described below, and the following describes its action.

Firstly, air bearing 70 is formed by supplying high-pressure air to gaps 71, 72 and 73 via pipe 75, through holes 74 and injection holes 76 by operating a compressor not shown. As a result, turntable 50 rotates freely in the directions of double-ended arrow R.

High-pressure air that is supplied to air bearing 70 forms air bearing 70 with sufficient rigidity, with a portion entering on the inside of turntable 50 through flow paths 77 which are formed in intermediate member 55 of turntable 50. This high-pressure air is then blown in the direction of direct drive motor 60.

At this time, as high-pressure air is also supplied to clamping device 90, pushing member 101 is pushed down in opposition to the force of compression coil spring 104 by the action of this air. Thus, clamping of diaphragm 80 by clamping device 90 is released and there is no obstruction whatsoever of the rotation of turntable 50.

Next, air inside main chamber 23, which includes that inside turntable 50, is discharged to the outside from screen 38 via ventilation holes 32 and 25 as well as auxiliary chamber 24 following operation of exhaust fan 36. At the same time, when the direction of rotation and speed are set by a control device not shown following operation of direct drive motor 60, turntable 50 rotates at the specified speed in one of the directions indicated by double-ended arrow R.

At this time, after air supplied from a compressor (not shown) fills gaps 71, 72 and 73 which compose air bearing 70, the air arrives at the vicinity of direct drive motor 60 after passing through flow paths 77. As a result, generation of heat by coil 63 and so on of stator 61 is cooled by this air, and on the other hand, the air that is warmed by this coil 63 and so on is suctioned by exhaust fan 36 through auxiliary chamber 24 from ventilation holes 32 formed in stator support member 29 and ventilation hole 25 formed in separating wall 22, after which it is released to the outside via screen 38.

In other words, heat that is produced in the portion of direct drive motor 60 is released to the outside with air supplied from flow paths 77 functioning as a cooling medium. Thus, there is no overheating of direct drive motor 60, and in turn, turntable 50.

The following provides a description of the advantages offered by the previously described embodiment.

More specifically, as direct drive motor 60 is employed as a driving device which drives rotary shaft 65 fixed on turntable 50, the use of speed reducers, worm gears and worm wheels used in the prior art can be eliminated. This results in a corresponding reduction in the size of the turntable. Moreover, since there is no mechanical contact such as that by gears, it is possible to eliminate backlash thereby offering the advantage of dramatically improving rotational accuracy.

In addition, as a result of employing air bearing 70, that can be supported in both the horizontal and vertical directions, as a bearing device, rotation of turntable 50 can be performed extremely smoothly.

Moreover, since there is no occurrence of friction, rubbing, sticking or slipping because each of the respective members in gaps 71, 72 and 73 which compose air bearing 70 do not make contact and are able to balance out slight unevenness in, for example, the surfaces of stationary member 27 and outer plate 51, rotational accuracy is improved thereby allowing high-precision measurement. Furthermore, the present embodiment does not require the use of only high-precision bearings, requiring time both in handling and selection, in order to improve rotational accuracy as in the case of the prior art, but rather allows rotary devices to be manufactured at low cost without decreasing the productivity of said rotary table 10 as a result of using air bearing 70. Moreover, in the case of this embodiment, not only is the air of air bearing 70 used as a bearing, its primary objective, but it is also used in a secondary sense as a means of cooling direct drive motor 60. In other words, since this embodiment is able to discharge air that has been warmed in the vicinity of motor 60 to the outside via flow paths 77 connected to the vicinity of direct drive motor 60 from gaps 71, 72 and 73 which form air bearing 70, and screen 38, which is connected to the outside of rotary table 10 from the vicinity of motor 60, turntable 50 is subjected to virtually no thermal effects caused by generation of heat by direct drive motor 60 as in the prior art. As a result, the present invention is able to offer the advantage of rotational accuracy being further improved thereby allowing precision measurement.

In addition, as exhaust fan is installed in auxiliary chamber 24, air that has been warmed in the vicinity of direct drive motor 60 can be forcibly sent to the outside which also results in an additional improvement of the rotational accuracy of rotary table 10.

Moreover, if exhaust fan 36 is allowed to operate for a specified period of time even after motor 60 has stopped, residual heat contained within rotary table 10 can also be efficiently released to the outside.

Although the above has described one preferred embodiment of the present invention, the present invention is not restricted to this preferred embodiment alone, but can naturally be improved in various ways or altered in terms of the design so long as such improvements or design changes do not deviate from the purpose of the present invention.

For example, the fluid bearing device of turntable 50 is not restricted to the use of air bearing 70, but may be an ordinary bearing. However, the present invention will offer the advantages described above if air bearing 70 is used.

In addition, the driving mechanism is not restricted to the use of motorized direct drive motor 60 as in the embodiment described above, but other driving devices of the direct drive type may also be used, such as pneumatic or hydraulic motors.

In addition, in the case turntable 50 is rotating at a specified speed in one of the directions of double-ended arrow R, a stop or emergency stop button is activated in the case of stopping or emergency stopping after work is completed or if there is a need to protect turntable 50 from unexpected accidents and so on.

When this is done, the supply of high-pressure air to clamping device 90, indicated in FIG. 5, from a compressor (not shown) is stopped. As a result, the pressure of cylinder chamber 105 will decrease and pushing member 101 will be displaced in the direction of arrow Z by the pushing force of compression coil spring 104. Accompanying this, diaphragm 80 is pinched between pushing member 101 and attaching member 91 causing it to be clamped resulting in the stopping of the rotation of turntable 50 which is formed in an integrated manner with diaphragm 80.

Figure 6:
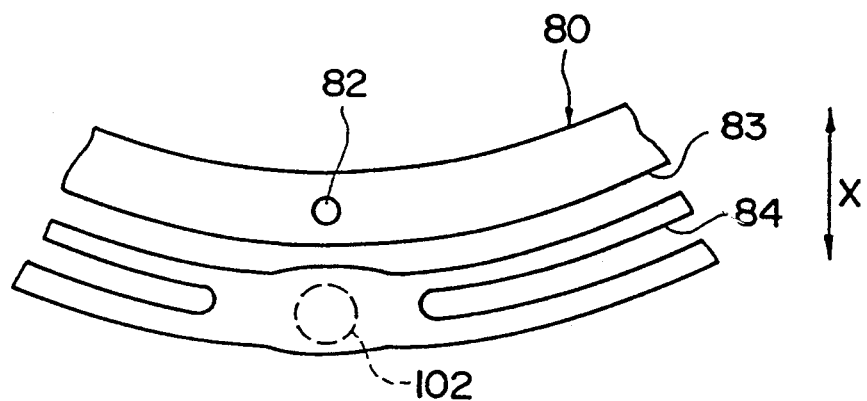
FIG. 6 is an enlarged overhead view of a portion of the braking disk of FIG. 5 during action of the clamping device.
Figure 7:
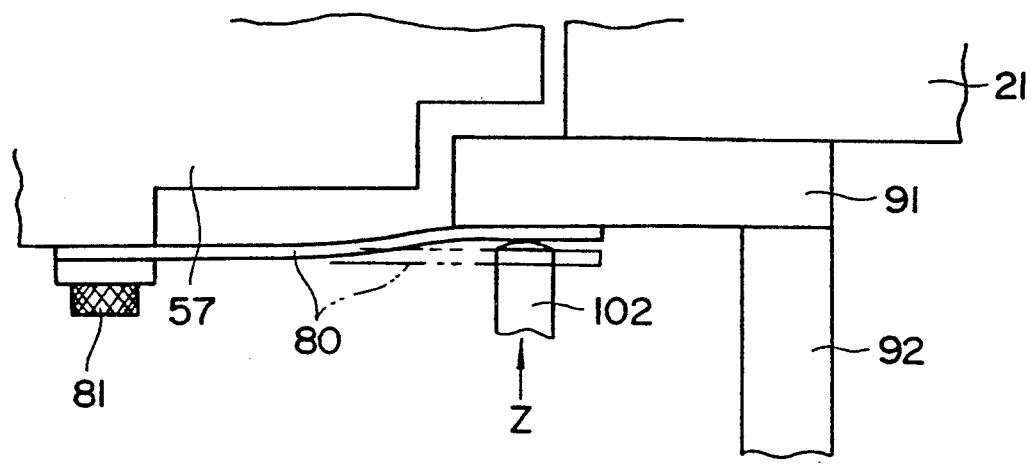
FIG. 7 is an enlarged diagrammatic view similar to part of FIG. 7 and showing the braking disk being clamped by the clamping device.

In the clamping of diaphragm 80 by clamping device 90, diaphragm 80, which is elastically deformable and possesses oblong holes 83 and 84, deforms as indicated in FIG. 6 and FIG. 7.

In other words, the force which acts in the thrust direction (arrow Z) is absorbed by the elastic deformation of diaphragm 80 (see FIG. 7), and the force in the radial direction (arrow X), which is applied roughly perpendicular to that in the thrust direction, is absorbed by oblong holes 83 and 84 (see FIG. 6).

As a result, even if, for example, pushing member 101 should happen to clamp diaphragm 80 at a slight inclination due to the effects of incorporation tolerance and so on, the total amount of the force that acts in the thrust direction (arrow Z), radial direction (arrow X) or a combination of the two, is absorbed by diaphragm 80 thereby resulting in stopping of turntable 50. Thus, turntable 50 is stopped without the occurrence of inclination or eccentricity.

The following provides a description of the advantages offered by the previously described clamping device.

More specifically, as diaphragm 80, in the form of a elastically deformable disk, is used for the stopping of turntable 50 of rotary table 10, thrust or radial forces are not applied to turntable 50 even when turntable 50 is stopped by clamping diaphragm 80 with clamping device 90.

Thus, turntable 50 is not subjected to the occurrence of inclination or eccentricity, which prevents the occurrence of a decrease in rotational accuracy based on such inclination or eccentricity. As a result, the clamping device of the present invention offers the advantage of constantly allowing precision measurement of measured objects and precision processing of workpieces.

Although the above has described one preferred embodiment of the clamping device, the present invention is not restricted to this preferred embodiment alone, but can naturally be improved in various ways or altered in terms of the design so long as such improvements or design changes do not deviate from the purpose of the present invention.

For example, oblong holes 83 and 84 of diaphragm 80 are not required to be provided in two rows, but may be provided in 1 row or 3 rows. In addition, oblong holes 83 and 84 may also have other shapes, for example, a plurality of circular holes in a radiating pattern. However, the use of oblong holes 83 and 84 offer the advantage of the resistance produced in diaphragm 80 being extremely small during deformation in the thrust direction.

Moreover, the composition of clamping device 90 is not restricted to the previously described embodiment, but may consist of the use of another type of motive power source such as a solenoid. At this time, the use of the force of a spring in the same manner as in the previously described embodiment for the clamping force of clamping device 90 offers the advantage of being able to perform clamping despite loss of electrical power or air pressure thereby ensuring a high level of safety.

In the case of the previously described clamping device, the present invention offers the advantage of there being hardly any deterioration of accuracy due to the extremely low amount of eccentricity in the turntable that results during clamping of the turntable.

Next, a preferred embodiment will be described in regard to the fine positioning mechanism and fine positioning method pertaining to the present invention with reference to the attached drawings.

Figure 8:
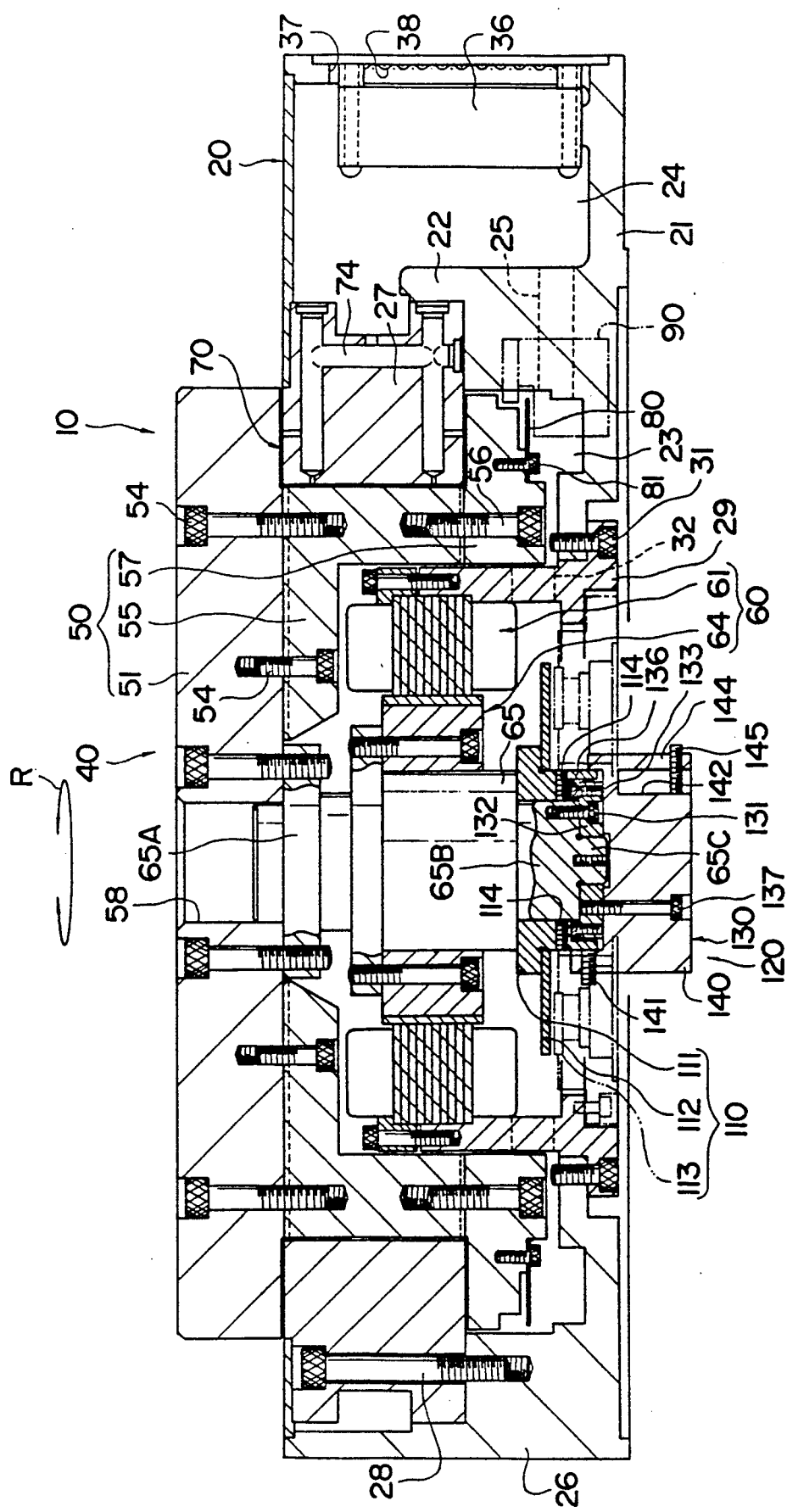
FIG. 8 is sectional view similar to FIG. 2 but also showing on a rotary table thereof a fine position mechanism.
Figure 11:
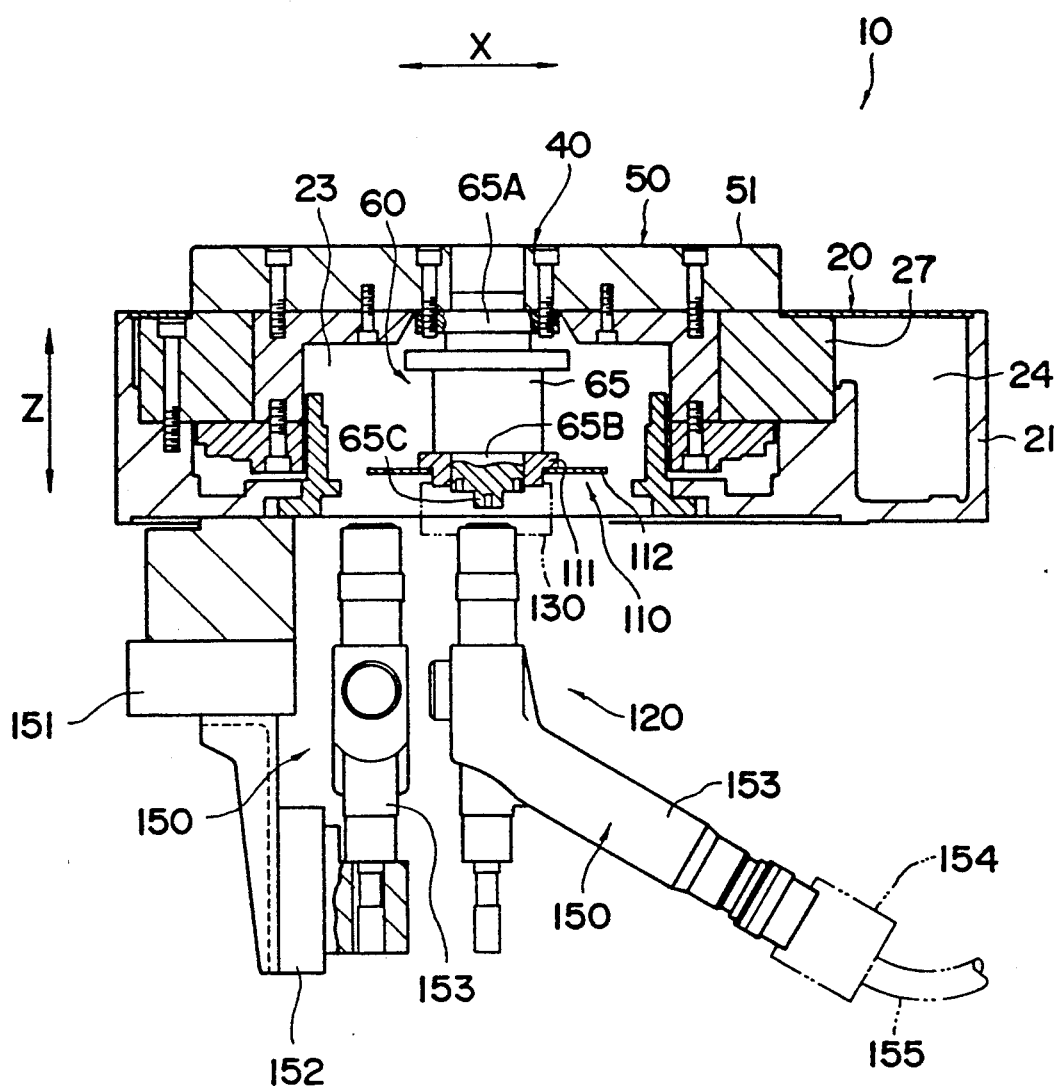
FIG. 11 is a sectional view similar to FIG. 2 and FIG. 12 are is a bottom view which each show a monitoring device attached to a rotary table which is a component of the embodiment of FIG. 1; and, FIG. 13 through FIG. 16 are drawings which indicate an example of the prior art, with FIG. 13 being an overhead view indicating the overall composition, FIG. 14 being a front view of FIG. 13, FIG. 15 being a fragmentary sectional view taken along line 15—15 in FIG. 14, and FIG. 16 being a fragmentary sectional view taken along line 16—16 in FIG. 13.
Figure 12:
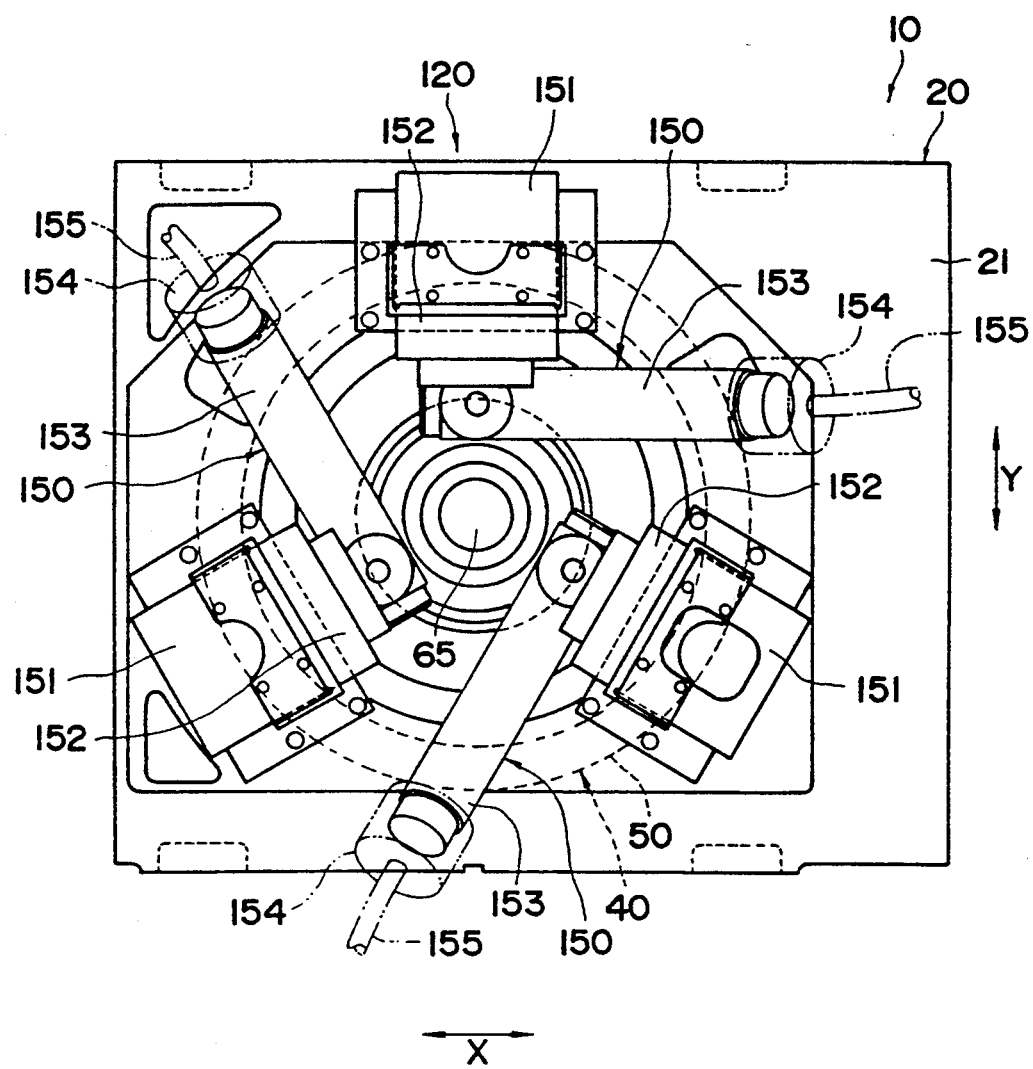
Figure 13:
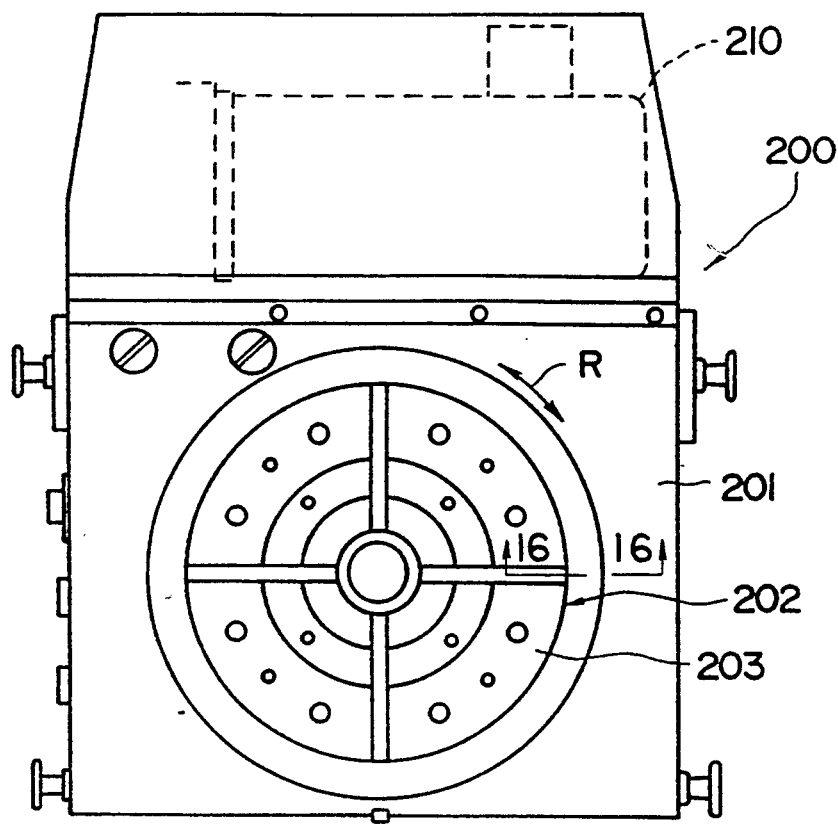
Figure 14:
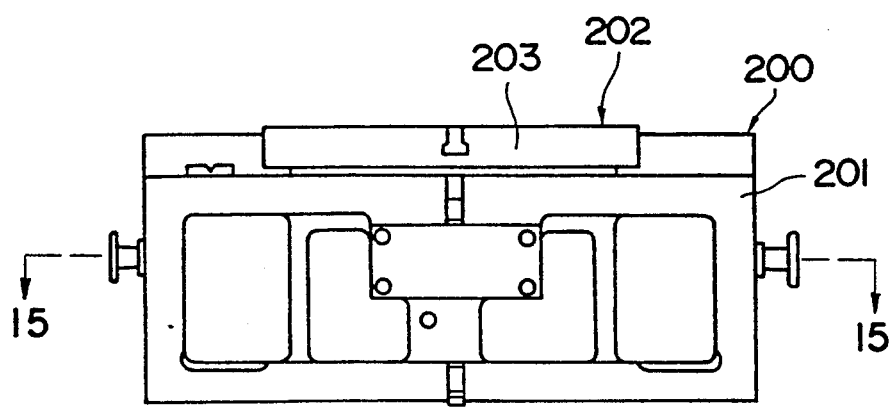
Figure 15:
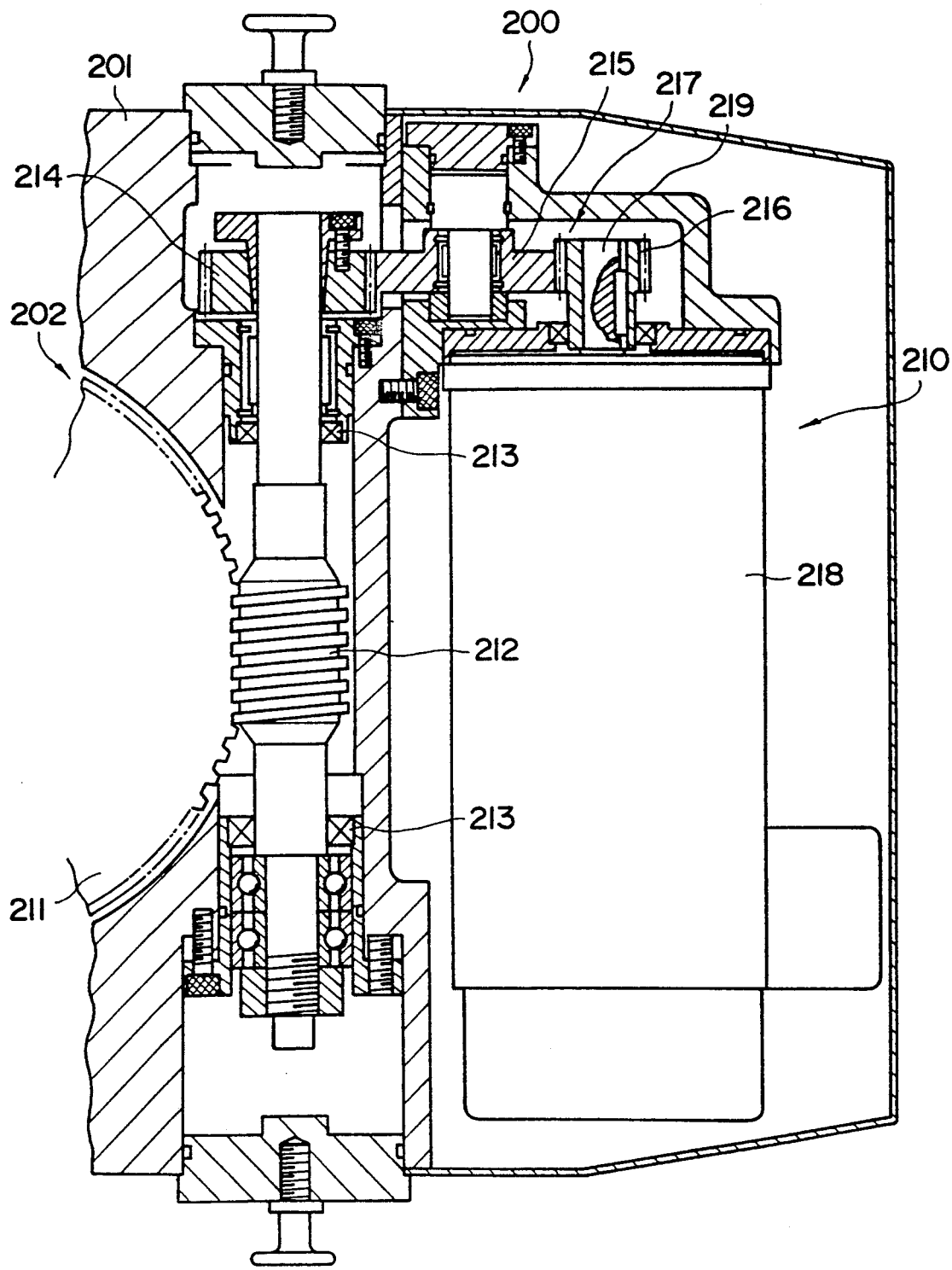
Figure 16:
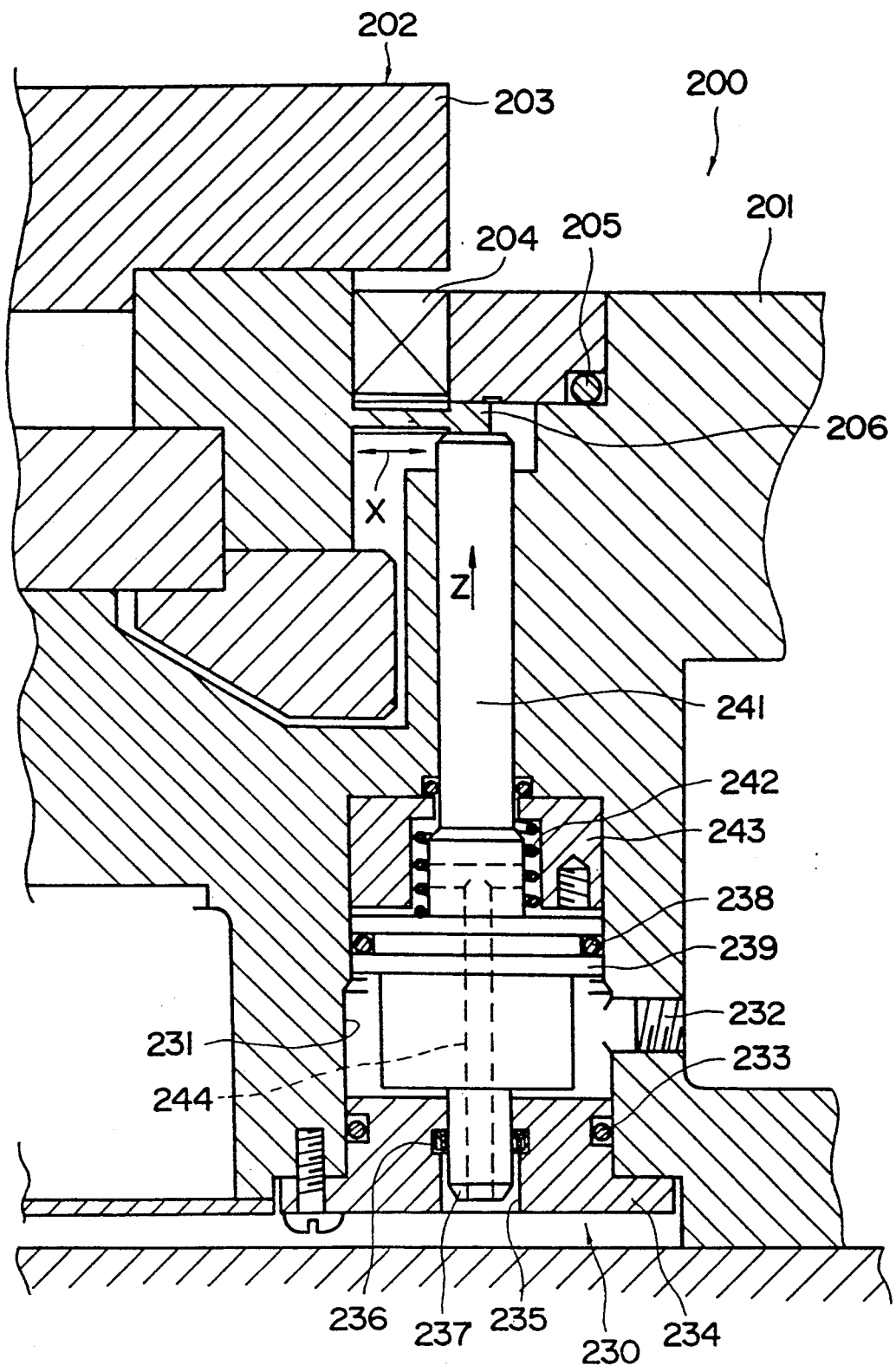

In FIG. 8, FIG. 11 and FIG. 12, reference number 10 indicates a rotary table which functions as a rotating device on which simple fine positioning mechanism 120 is mounted with respect to the present invention.

Encoder disk 112, functioning as a rotor, is attached via roughly cylindrical holding member 111 to small diameter portion 65B on the lower portion of rotary shaft 65 of rotor 64, so that it can be attached and removed, by means of locking screw 114 functioning as a fastening device. Rotary encoder 110 is composed of encoder disk 112, index scale 113, which is arranged in opposition to encoder disk 112, and an optical scale sensor head not shown. The speed of rotor 64, and in turn, direct drive motor 60 is detected by rotary encoder 110.

Furthermore, in FIG. 8, since positioning jig 130 to be described later is attached to holding member 111, index scale 113 and the optical sensor are attached after removing positioning jig 130, without being attached to case 21.

Figure 9:
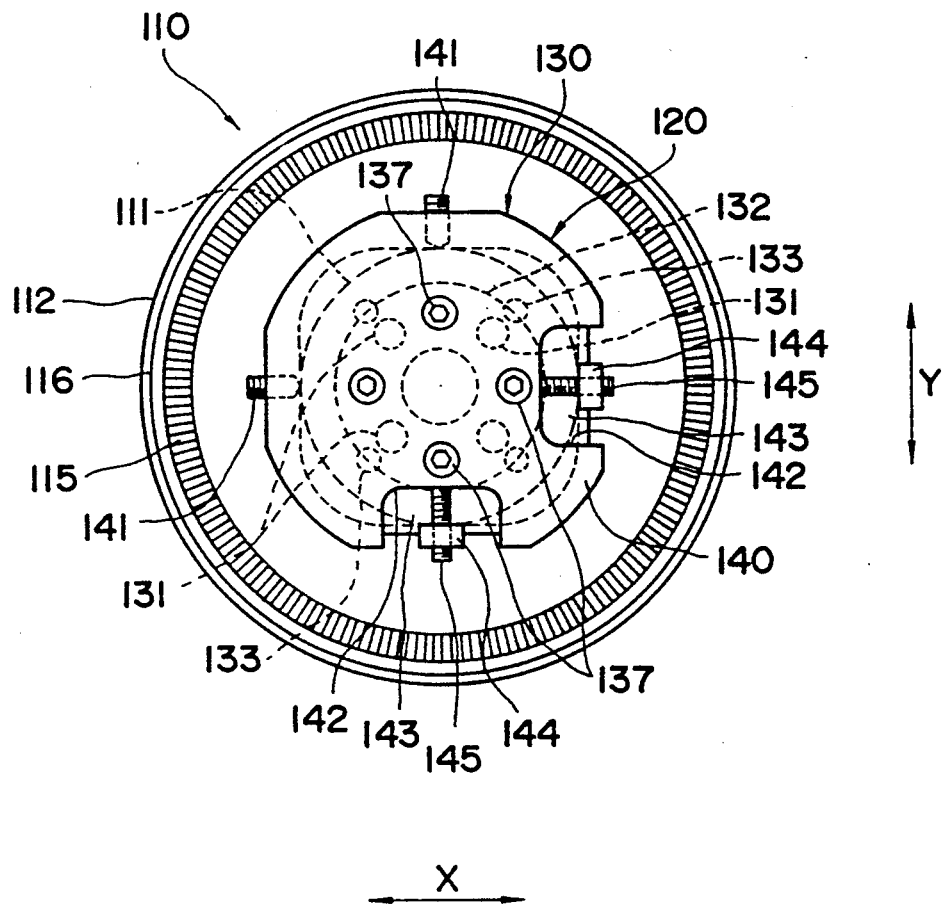
FIG. 9 is a bottom view of the major components in a central portion of FIG. 8.

As is indicated in FIG. 9, sensing portion 115, consisting of a fine scale, and reference circle 116 are provided on one side of encoder disk 112.

Figure 10:
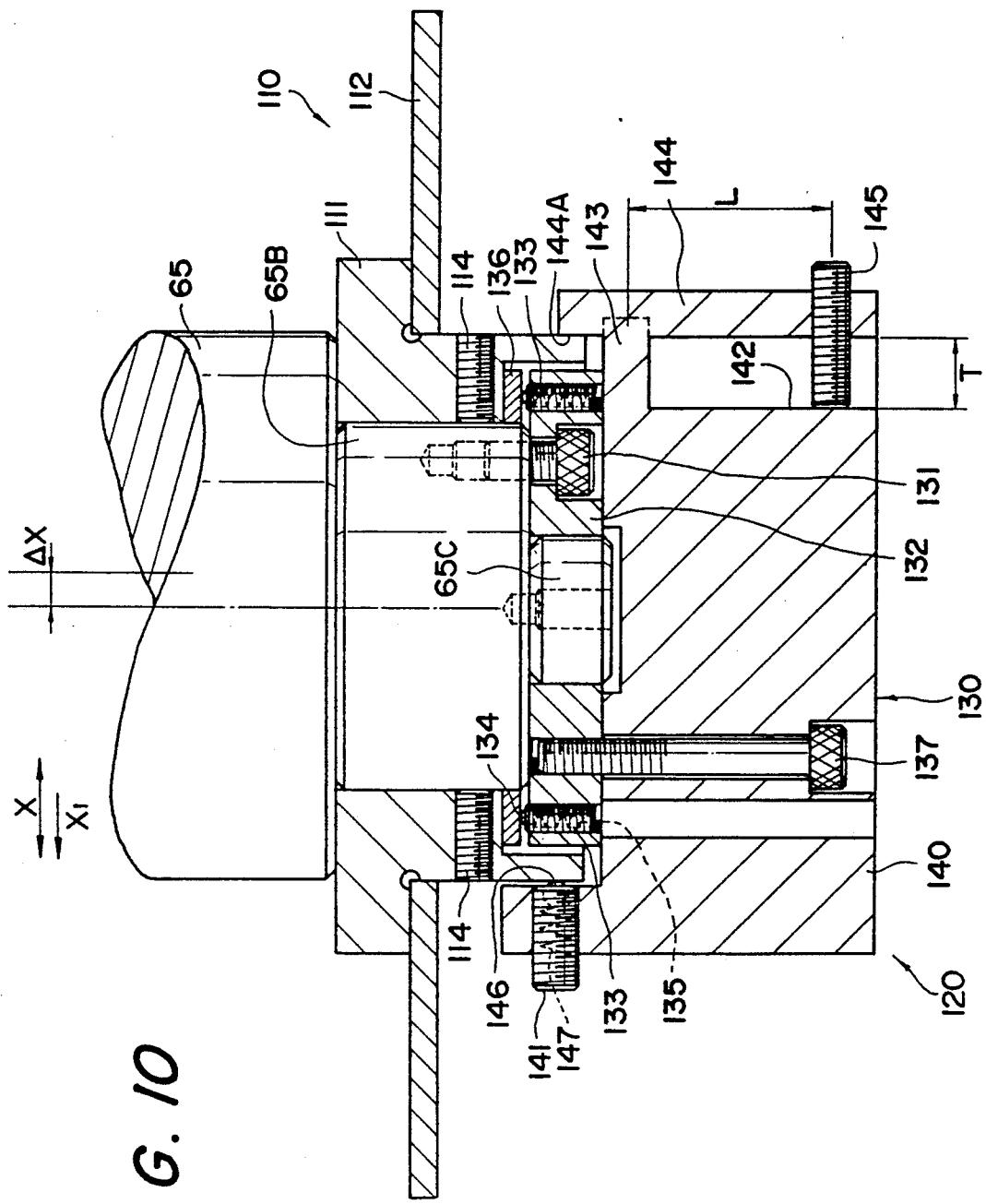
FIG. 10 is an enlarged cross-sectional view of a portion of FIG. 8.

As is indicated in FIG. 10, FIG. 11 and FIG. 12, simple fine positioning mechanism 120 is mounted in the vicinity of the lower portion of rotary encoder 110. Simple fine positioning mechanism 120 is equipped with positioning jig 130, which is attached to rotary encoder 110, and three monitoring devices 150 having the same composition, which are attached to fixed portion 20 such as case 21 at locations that are separated by equal distances (preferably at angles of 120 degrees).

As is indicated in enlarged form in FIG. 10, positioning jig 130 contains intermediate plate 132 fixed to rotary shaft 65 with bolt 131 in verification of projecting shaft 65C provided on rotary shaft 65. A plurality of spring plungers 133 are screwed into intermediate plate 132 at equidistant locations around the perimeter so as to allow forward and backward movement in the axial direction.

Spring plunger 133 contains ball 134 and compression coil spring 135 which functions as a pressure device that applies force on ball 134 in the direction of protrusion. Ball 134 of spring plunger 133 makes contact with holding member 111 via pushing plate 136 consisting of a plastic plate. As a result, force is constantly applied on holding member 111 which pushes it vertically upward.

Jig body 140 is attached to intermediate plate 132 via screw 137. Two spring plungers 141 (see FIG. 9) are screwed into jig body 140 at locations 90 degrees apart. On the other hand, two notches 142 roughly in the shape of the letter "U" are formed in jig body 140 at opposite locations to spring plungers 141. Projections 144, in the shape of square columns are respectively provided projecting from fulcrums 143, which are in the form of thin plates remaining in an integrated fashion on jig body 140, inside each of notches 142. Set screws 145 are screwed into the lower portions of projections 144 so as to be in contact with each of notches 142.

Spring plungers 141 are equipped with ball 146 and compression coil spring 147, functioning as a pressure device which applies force to ball 146 in the direction of projection. Jig body 140 is able to clamp holding member 111 with the inside surfaces 144A of the upper portions of projections 144 and spring plungers 141 due to the force applied by coil spring 147.

Thus, when encoder disk 112 fixed on holding member 111 is eccentric with respect to rotary shaft 65, jig body 140 is displaced by a slight distance (several micrometers) in the directions indicated by arrows X and Y by adjusting two set screws 145, thus allowing fine positioning of encoder disk 112.

Each of the monitoring devices 150 are of the same composition, and each contain XY stage 151 which can be displaced radially to the inside and outside. Z slider 152, which is displaced in the direction of arrow Z, is mounted on XY stage 151, and moreover, centering microscope 153 is provided on the end of Z slider 152. Each of the centering microscopes 153 is arranged to allow visual confirmation of sensing portion 115 and reference circle 116 of encoder disk 112, and allow monitoring of three locations separated by 120 degrees on encoder disk 112 with the three centering microscopes 153.

Camera 154 is attached to each centering microscope 153, with camera 154 being connected to a monitor device not shown via cable 155.

Rotary table 10 on which is mounted simple fine positioning mechanism 120 of the rotor pertaining to this embodiment is basically composed in the manner described above. The following provides an explanation of its action.

Firstly, an explanation will be provided regarding the method of attachment of fine positioning mechanism 120.

After first mounting holding member 111 on the outside of small diameter portion 65B on the lower portion of rotary shaft 65, holding member 111 is temporarily fixed in position by tightening locking screws 114. At this time, perform positioning by adjusting the amount by which each of locking screws 114 are screwed in so that there is a certain degree of eccentricity on the order of several tens of micrometers in holding member 111, and in turn, encoder disk 112 functioning as a rotor, with respect to rotary shaft 65.

Next, the following describes the procedure for attaching positioning jig 130 of fine positioning mechanism 120 to rotary shaft 65.

More specifically, together with intermediate plate 132 being attached to rotary shaft 65 via bolt 131, holding member 111 is forced vertically upward by pushing plate 136 and spring plunger 133 in the state in which pushing plate 136 of positioning jig 130 is mounted between holding member 111 and positioning jig 130. At this time, locking screws 114 are removed in order to allow fine adjustment on the sub-micron meter order (several tenths of a micron) of encoder disk 112. Next, jig body 140 of positioning jig 130 is attached to intermediate plate 132 by means of screw 137 so that a portion of spring plungers 141 of jig body 140 and upper inner surfaces 144A of projections 144 cover the outer circumference of holding member 111. At this time, set screws 145 that are screwed into projections 144 are screwed in to a certain degree in advance to pre-deform projections 144 centering on fulcrums 143.

Next, spring plungers 141 are turned in to allow upper inside surfaces 144A of projections 144 of jig body 140 to make contact with holding member 111, thus resulting in holding member 111, and in turn, encoder disk 112 functioning as a rotor, to be clamped by spring plungers 141 and projections 144 in opposition to the force applied by compression coil springs 147 functioning as pressure devices within spring plungers 141.

Next, as is indicated in FIG. 11 and FIG. 12, three monitoring devices 150 are mounted case 21, which is fixed member 20. At this time, setting is performed such that each of the centering microscopes 153 are positioned directly above reference circle 116 of encoder disk 112.

More specifically, XY stages 151 are radially displaced to the inside and outside so that reference circle 116 moves to the centers of each of the centering microscopes 153.

Adjustment is then performed by visually confirming the locations of the focal points of each of the centering microscopes 153 by means of each of the Z sliders 152 with a monitor not shown.

On the other hand, direct drive motor 60 is operated together with forming air bearing 70 by supplying air from a compressed air supply source not shown to through holes 74.

Holding member 111 attached to rotary shaft 65, encoder disk fixed on holding member 111, and positioning jig 130 mounted on holding member 111 begin to rotate as a result of operation of motor 60.

Accompanying this, rotating reference circle 116 is displayed on a monitor not shown. When reference circle 116 being displayed on the previously mentioned monitor is not deflecting up and down or to the right and left, this indicates that there is no eccentricity in said encoder disk 112 with respect to rotary shaft 65. On the other hand, when reference circle 116 defects up and down or to the right and left, this indicates that there is eccentricity in encoder disk 112 with respect to rotary shaft 65.

For example, in the case the center of the shaft of encoder disk 112 has shifted off center by an amount $\Delta x$ in the direction of arrow X with respect to rotary shaft 65 as is indicated in FIG. 10, the specified set screw 145, in other words that shown in FIG. 10, is screwed in. When this is done, since the width T of notch 142 will increase, upper inner surface 144A of projection 144 of jig body 140 will be pushed in the direction of arrow X1. As a result, holding member 111 will be displaced in the direction of arrow X1 and accompanying this, encoder disk 112 will also be displaced in the direction of arrow X1.

Thus, if the amount by which set screw 145 is turned in is adjusted so that the amount of eccentricity $\Delta x$ becomes approximately 0, fine positioning on the sub-micron meter order (several tenths of a micron) of encoder disk 112 becomes possible. This fine positioning can be performed both extremely accurately and easily even if the lead of set screw 145 is extremely small because the dimension L from fulcrum 143 to the position where set screw 145 is screwed in is relatively large. On the other hand, in the case encoder disk 112 is off center in the direction of arrow Y, eccentricity can be corrected in the same manner as described above by adjusting the set screw 145 located at a position 90 degrees from the set screw 145 described above.

At the point fine positioning work of encoder disk 112 is completed in this manner, locking screws 114 are screwed into holding member 111 to formally lock encoder disk 112 in position on rotary shaft 65. This is followed by removal of monitoring devices 150, positioning jig 130 and intermediate plate 132, etc., and mounting of the remaining components, including index scale 113, the scale sensor head not shown and the bottom cover, to complete rotary table 10. This is finally followed by packing in preparation for shipment.

The following provides a description of the advantages offered by the previously described fine positioning mechanism.

More specifically, as positioning jig 130 and monitoring devices 150 are provided for fine positioning mechanism 120, in the case encoder disk 112 is off center, fine positioning on the sub-micron order of said encoder disk is possible by suitably adjusting two set screws 145.

Thus, the angle indexing accuracy of rotary encoder 110, and in turn, rotary table 10 functioning as a rotating device, are improved, thereby allowing precise measurement of measured objects and precise processing of workpieces.

Moreover, the fine positioning method of the fine positioning mechanism of the present invention also offers the advantage of allowing work to be simplified while also reducing work time.

In addition, since a vibrating device such as a vibrator in the case of the prior art is not required to be mounted on fine positioning mechanism 120, it also offers the advantages of reduced costs and compact size.

Moreover, since set screws 145 for adjusting the eccentricity of encoder disk 112 with respect to rotary shaft 65 are screwed in at locations that are removed from the fulcrums 143 of deformation of projections 144 by distance L, extremely fine positioning can be performed even when the leads of set screws 145 are extremely small.

In addition, since monitoring devices 150, which monitor reference circle 116 of encoder disk 112, are not excessively large objects for monitoring the entire encoder disk 112, but rather are provided on three stands for monitoring three locations, the degree of eccentricity of encoder disk 112 can be monitored accurately.

Moreover, each of monitoring devices 150 can be moved arbitrarily in both the radial and axial directions of encoder disk 112 by using XY stages 151 and Z sliders 152, thereby allowing positioning and focusing of reference circle 116 to be performed easily.

Although the above has described one preferred embodiment of the fine positioning mechanism, the present invention is not restricted to this preferred embodiment alone, but can naturally be improved in various ways or altered in terms of the design so long as such improvements or design changes do not deviate from the purpose of the present invention.

For example, the rotating device is not restricted to rotary table 10, but may also be other devices such as a rotary encoder alone or a roundness measuring instrument.

In addition, jig body 140 may be directly attached to rotary shaft 65 instead of being attached via intermediate plate 132. At this time, in the case of not using intermediate plate 132, release of locking screw 114 of holding member 111 is naturally performed after jig body 140 is attached to rotary shaft 65.

Moreover, not only encoder disk 112, but also that containing holding member 111 may function as the rotor.

Accordingly, a thick-walled holding portion may be provided in an integrated manner with encoder disk 112 to function as encoder disk 112. In short, the rotor is not restricted to being a member in the shape of an encoder disk, but may be any member which rotates attached to rotary shaft 65 after fine positioning.

In addition, rotary shaft 65 need not be a shaft of direct drive motor 60.

The fine positioning mechanism described above offers the advantage of easily allowing fine positioning of the rotor with respect to the rotary shaft.

Furthermore, the shape and structure of each component in the present invention can be altered within a range that allows it to accomplish similar actions.

What is claimed is:

1. A rotating device comprising: a fixed portion, a movable portion which includes a rotary shaft, a rotor that can be fastened in an integrated manner onto the rotary shaft via a fastening mechanism, a driving device for directly rotating the rotary shaft, a fluid bearing device for reducing friction between the fixed portion and the movable portion, and a through hole which is formed in the fixed portion for supplying fluid to said fluid bearing device, wherein said fluid bearing device is an air bearing, and wherein flow paths are formed in the movable portion and connect said air bearing to a vicinity of the driving device to allow the supply of air of said air bearing through the flow paths to function as cooling air for said driving device.

2. A rotating device according to claim 1, wherein said driving device is a direct drive motor.

3. A rotating device according to claim 1, including: a disk provided on the movable portion coaxial to the shaft and being elastically deformable in at least an axial direction; and a clamping device provided on the fixed portion for clamping said disk using axially-directed clamping forces, rotating of the movable portion being stopped by clamping of said disk.

4. A rotating device according to claim 3, wherein said disk has therein a plurality of oblong holes at angularly offset locations.

5. A rotating device according to claim 3, wherein said clamping device uses air for its pressure source and clamps said disk in the absence of a supply of pressurized air thereto.

6. A rotating device according to claim 1, including a casing having therein said driving device, said fixed portion being part of said casing, including means providing fluid communication between said vicinity of the driving device and a location external to said casing, and including a fan supported on said casing for causing air to flow from said vicinity of the driving device to said location external to said casing.

7. An apparatus comprising: a first member, a second member supported on said first member for rotation about a pivot axis with respect thereto, drive means for effecting rotation of said second member relative to said first member about said pivot axis, a braking mechanism which includes first and second braking members spaced radially from said pivot axis and supported for movement relative to each other in a direction approximately parallel to said pivot axis between a braking position in which said braking members are adjacent and a deactuated position in which said braking members are farther apart than in said braking position, said braking mechanism including means for effecting relative movement of said braking members, and a braking part supported on said second member and having an annular portion which is concentric to said pivot axis and extends between said braking members, said braking part being freely rotatable with respect to said braking members when said braking members are in said deactuated position and being clamped between said braking members when said braking members are in said braking position, wherein said annular portion of said braking member is elastically deformable, and wherein when said braking members are in said braking position a part of said annular portion disposed between and engaged by said braking members is elastically deformed.

8. An apparatus according to claim 7, wherein said braking part has, in a further portion thereof located radially between said annular portion and said pivot axis, a plurality of angularly spaced arcuate slots which are concentric to said pivot axis, said arcuate slots in said further portion facilitating limited radial and axial movement of said annular portion relative to said second member.

9. An apparatus according to claim 8, wherein said further portion includes a plurality of angularly spaced further arcuate slots which are each concentric to said pivot axis and are spaced a short radial distance from said first-mentioned slots, each of said further slots angularly overlapping adjacent ends of a respective pair of said first-mentioned slots which are adjacent.

10. An apparatus comprising: a first member having thereon an annular support portion which has an upwardly facing annular first surface, a radially inwardly facing annular second surface, and a downwardly facing annular third surface; a second member having therein a circumferential groove which receives said support portion, said circumferential groove having therein a downwardly facing annular fourth surface adjacent and parallel to said first surface, a radially outwardly facing annular fifth surface adjacent and parallel to said second surface, and an upwardly facing annular sixth surface adjacent and parallel to said third surface; air pressurizing means which is physically separate from said first and second members; air supply means for facilitating a supply of pressurized air from said air pressurizing means through three separate passageways to respective air gaps respectively located between said first and fourth surfaces, between said second and fifth surfaces, and between said third and sixth surfaces; and selectively actuable means for effecting rotational movement of said second member relative to said first member about pivot axis.

11. An apparatus comprising: a first member having thereon an annular support portion which has an upwardly facing annular first surface, a radially inwardly facing annular second surface, and a downwardly facing annular third surface; a second member having therein a circumferential groove which receives said support portion, said circumferential groove having therein a downwardly facing annular fourth surface adjacent and parallel to said first surface, a radially outwardly facing annular fifth surface adjacent and parallel to said second surface, and an upwardly facing annular sixth surface adjacent and parallel to said third surface; air supply means for facilitating a supply of pressurized air to respective air gaps respectively located between said first and fourth surfaces, between said second and fifth surfaces, and between said third and sixth surfaces; and selectively actuable means for effecting rotational movement of said second member relative to said first member about said pivot axis; wherein said air supply means includes means defining passageways within said first member which lead to a plurality of angularly spaced openings provided in each of said first, second and third surfaces, said pressurized air being supplied to said air gaps through said passageways and said openings.

12. An apparatus comprising: a first member having thereon an annular support portion which has an upwardly facing annular first surface, a radially inwardly facing annular second surface, and a downwardly facing annular third surface; a second member having therein a circumferential groove which receives said support portion, said circumferential groove having therein a downwardly facing annular fourth surface adjacent and parallel to said first surface, a radially outwardly facing annular fifth surface adjacent and parallel to said second surface, and an upwardly facing annular sixth surface adjacent and parallel to said third surface; air supply means for facilitating a supply of pressurized air to respective air gaps respectively located between said first and fourth surfaces, between said second and fifth surfaces, and between said third and sixth surfaces; selectively actuable means for effecting rotational movement of said second member relative to said first member about said pivot axis; and means for providing fluid communication from one of said air gaps to a region within said first part which has therein said selectively actuable means.

13. An apparatus according to claim 12, wherein said means for providing fluid communication from said one of said air gaps to said region includes a passage extending through said second member, including means defining a passageway in said first member from said region therein to a location external to said first member, and including a fan for effecting air flow through said passageway from said region to said location external to said first member.

* * * * *

UNITED STATES PATENT AND TRADEMARK OFFICE
CERTIFICATE OF CORRECTION

PATENT NO. : 5 239 892

DATED : August 31, 1993

INVENTOR(S) : Hisayoshi SAKAI

It is certified that error appears in the above-identified patent and that said Letters Patent is hereby corrected as shown below:

```
Column 18, line 42; change "member" to ---part---.
Column 19, line 15; after "about" insert ---a---.
           line 34; change "said" (second occurrence)
                    to ---a---.
Column 20, line 23; change "said" (second occurrence)
                    to ---a---.
           line 25; change "part" to ---member---.
```

Signed and Sealed this

Nineteenth Day of April, 1994

*Attest:*

BRUCE LEHMAN

*Attesting Officer*      *Commissioner of Patents and Trademarks*